(12) United States Patent
Zawacki et al.

(10) Patent No.: US 9,013,440 B2
(45) Date of Patent: Apr. 21, 2015

(54) INK CONTROL ON TABLET DEVICES

(75) Inventors: Jennifer Greenwood Zawacki, Hillsborough, NC (US); Justin Tyler Dubs, Durham, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 952 days.

(21) Appl. No.: 13/026,609

(22) Filed: Feb. 14, 2011

(65) Prior Publication Data

US 2012/0206397 A1   Aug. 16, 2012

(51) Int. Cl.
*G06F 3/041* (2006.01)
*G06F 3/0488* (2013.01)

(52) U.S. Cl.
CPC .................. *G06F 3/04883* (2013.01)

(58) Field of Classification Search
CPC .................................... G06F 3/04883
USPC .................................. 345/173, 179
See application file for complete search history.

(56) References Cited

U.S. PATENT DOCUMENTS

2005/0052406 A1* 3/2005 Stephanick et al. .......... 345/156
2010/0231558 A1* 9/2010 Kwak ........................... 345/179

* cited by examiner

*Primary Examiner* — Abbas Abdulselam
*Assistant Examiner* — Shawna Stepp Jones
(74) *Attorney, Agent, or Firm* — Brian J. Pangrle

(57) ABSTRACT

A method includes sensing two successive positional inputs input via a sensor display; determining a time difference between the two successive positional inputs; and rendering, to the sensor display, a graphic between the two successive positional inputs if the time difference does not exceed a time difference threshold. Various other apparatuses, systems, methods, etc., are also disclosed.

21 Claims, 8 Drawing Sheets

INK CONTROL ON TABLET DEVICES

TECHNICAL FIELD

Subject matter disclosed herein generally relates to techniques for ink control on tablet and other devices.

BACKGROUND

Various devices include a display with one or more sensors configured to receive user input. For example, many smart phones, tablet PCs and other devices include a sensor display (e.g., touch screen or other technology) that allows a user to draw directly on the display for purposes of text recognition, graphics, photo editing, etc. In such devices, one or more sensors generate signals to locate a user's finger or a stylus manipulated by a user. The signals generated by one or more sensors are usually in the form of coordinates (e.g., x and y; x, y and pressure; etc.). Once received, the device decides what should be rendered to the display, often referred to as "ink". As described herein, various technologies provide for enhanced control of ink.

SUMMARY

A method includes sensing two successive positional inputs input via a sensor display; determining a time difference between the two successive positional inputs; and rendering, to the sensor display, a graphic between the two successive positional inputs if the time difference does not exceed a time difference threshold. Various other apparatuses, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

DETAILED DESCRIPTION

The following description includes the best mode presently contemplated for practicing the described implementations. This description is not to be taken in a limiting sense, but rather is made merely for the purpose of describing the general principles of the implementations. The scope of the invention should be ascertained with reference to the issued claims.

As described herein, scenarios often arise where a user with a tablet or other device having a sensor display (e.g., touch screen or other technology) intends to draw a line, a curve, etc., by quickly move a finger or a stylus across the sensor display. Due to a variety of factors, sensor output may result in a discontinuous line, curve, etc., contrary to the user's intent. For example, low sensor resolution may result in few samples and jagged ink. As another example, contact between a finger or a stylus and a sensor display may be interrupted by bumps or lifts and result in discontinuous ink (e.g., the device considered the input as being discontinuous rather than continuous).

Approaches that address ink continuity issues through higher resolution sensor hardware can add significant cost. In an effort to reduce cost, so-called "touchless" is also being developed (e.g., using cameras), however, some indications exists that a camera-based touchless sensor display can be even more prone to factors that result in ink discontinuity.

As described herein, a method can act to ignore gaps between touches below one or more threshold amounts. In various examples, a threshold may be based on time, distance, distance with respect to time, or other characteristics. As described herein, a method may optionally call for implementation of one or more calibration algorithms to detect how quickly a user draws, writes, inputs with an ink feature. In turn, output can be adjusted to effectively handle any gaps. As described herein, a "smoothing" process based on one or more thresholds can improve readability and appearance of lines drawn with a finger, a stylus, a digitizer, etc.

Figure 1:
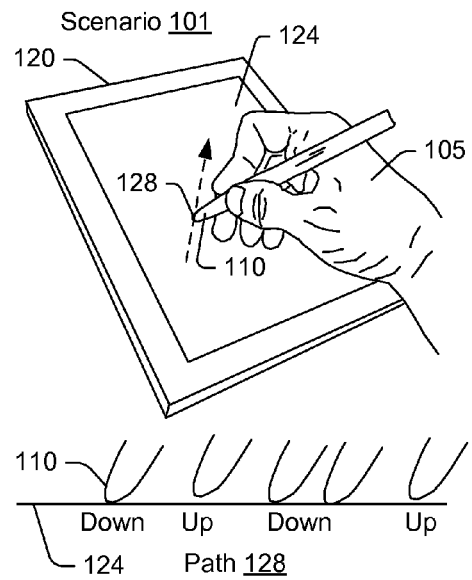
FIG. 1 is a series of diagrams of examples of a conventional method and a compensated method for control of ink.
Figure 1:
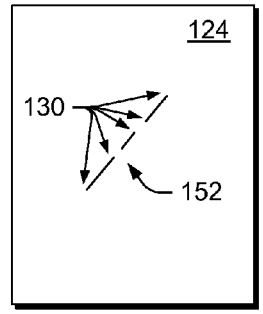
Figure 1:
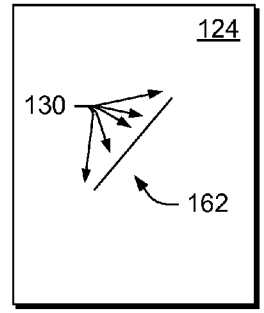
Figure 1:
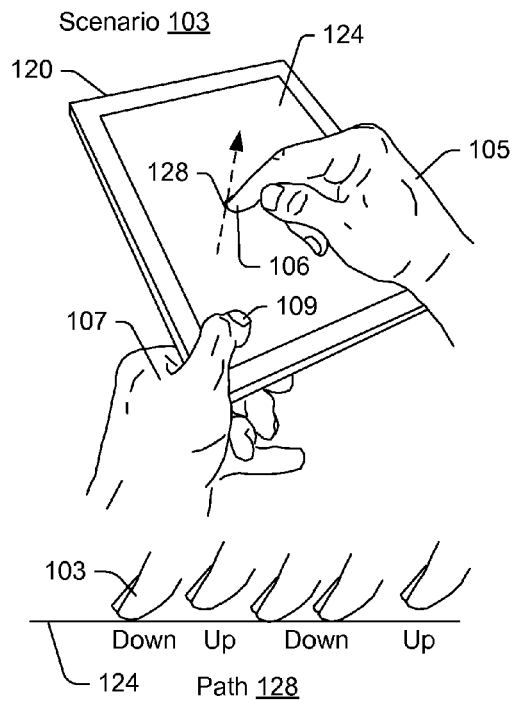
Figure 1:
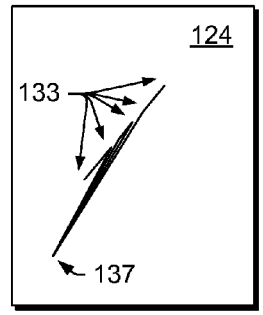
Figure 1:
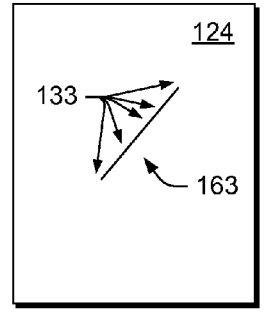

FIG. 1 shows examples of various two input scenarios 101 and 103 with respect to a conventional ink method 150 and two compensated ink methods 160 and 170. The scenario 101 pertains to a hand 105 of a user manipulating a stylus 110 with respect to a sensor display 124 of a device 120 where the user's hand 105 moves the stylus 110 in a direction along a path 128, as indicated by an arrow. A side view of the path 128 shows how the tip of the stylus 110 may move up and down with respect to the sensor display 124. In turn, the sensor display 124 outputs various coordinates, for example, including the coordinates associated with points 130.

In response to the user input and sensor display output, a conventional ink method 150 results in rendering of discontinuous ink 152. In contrast, a bump or lift compensated method 160 results in rendering of continuous ink 162. As described herein, a compensated method may rely on one or more characteristics of sensor display output and one or more thresholds to determine whether a graphic should be rendered as a continuous graphic between two points. With respect to "continuous", for example, where a user has selected a tool to draw a dashed line, as a graphic, such a line may be considered a continuous graphic (e.g., a user may elect to reformat the line to a different, non-dashed style).

The scenario 103 pertains to a hand 105 of a user manipulating a finger 106 with respect to a sensor display 124 of a device 120 where the user's finger 106 moves in a direction along a path 128, as indicated by an arrow. In the scenario 103, the user's other hand 107 is used to hold the device 120 where the thumb 109 is in contact with the sensor display 124. A side view of the path 128 shows how the tip of the user's finger 106 may move up and down with respect to the sensor display 124. Further, as the user's thumb 109 is in contact with the sensor display 124, the sensor display 124 outputs information for the thumb 109 as being an additional input. In turn, the sensor display 124 outputs various coordinates, for example, including the coordinates associated with points 133 and the point 137. In the scenario 103, as indicated by lines drawn between the points 133 and the point 137, the conventional ink method 150 registers the sensor display output for the thumb 109 as being a valid point 137 every time the user's finger 106 lifts from the sensor display 124.

In contrast, for the scenario 103, a bump or lift compensated method 160 results in rendering of continuous ink 163. Further, an extraneous input method 170 may act to compensate for any input received by the sensor display 124 that is associated with a user holding the device 120. As described herein, a compensated method may rely on one or more characteristics of sensor display output and one or more thresholds to determine whether a graphic should be rendered as a continuous graphic between two points.

Figure 2:
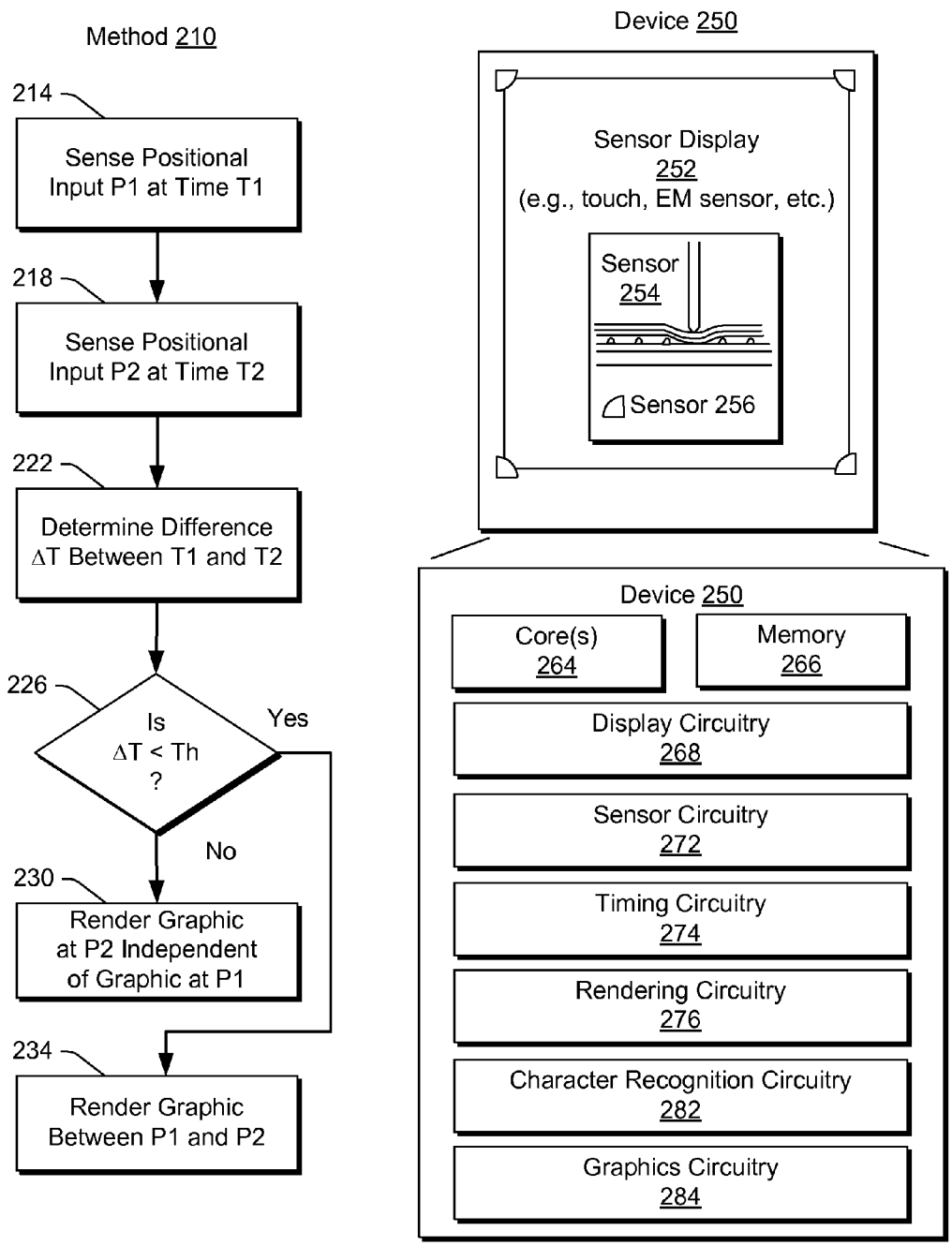
FIG. 2 is a series of diagrams of examples of a method and a device.

FIG. 2 shows an example of a method 210 and an example of a device 250, which may be configured to implement the method 210. The method 210 includes a sense block 214 for sensing positional input P1 at time T1 and a sense block 218 for sensing positional input P2 at time T2. Given positional inputs for the two times, in a determination block 222, the method 210 determines a difference ΔT between times T1 and T2. A decision block 226 follows that decides whether ΔT is less than a threshold value. If the decision block 226 decides that ΔT is not less than the threshold value, the method 210 continues at a render block 230 that calls for rendering a graphic at P2 independent of a graphic at P1. However, if the decision block 226 decides that ΔT is less than the threshold value, then the method 210 continues at a render block 234 that renders a graphic between P1 and P2. While the method 210 pertains to a time difference as a characteristic of the positional input, one or more other characteristics (see, e.g., characteristics 370 of FIG. 3) may be used, alternatively or additionally, with one or more associated thresholds.

The device 250 of FIG. 2 includes a sensor display 252. The sensor display 252 may rely on one or more sensors. For example, a display may be overlaid with a sensor 254 that relies on a resistive matrix. As another example, a display may be configured with one or more sensors 256 that rely on electromagnetic energy sensing (e.g., infrared radiation, visible radiation, etc.). While two general types of sensors are mentioned, other types of sensors may be used.

The device 250 may include one or more cores 264 (e.g., single or multicore processors), memory 266, display circuitry 268, sensor circuitry 272, timing circuitry 274, rendering circuitry 276, character recognition circuitry 282, graphics circuitry 284, and optionally other circuitry.

As described herein, a device can include a display, a sensor configured to sense positions of one or more objects in relation to the display, circuitry configured to determine a time difference between two successively sensed positions of an object and circuitry configured to render to the display a graphic connecting the two successively sensed positions if a time difference between the two successively sensed positions of an object does not exceed a time difference threshold. As mentioned, characteristics other than or in addition to time may be relied on in making decisions pertaining to ink rendering.

Figure 3:
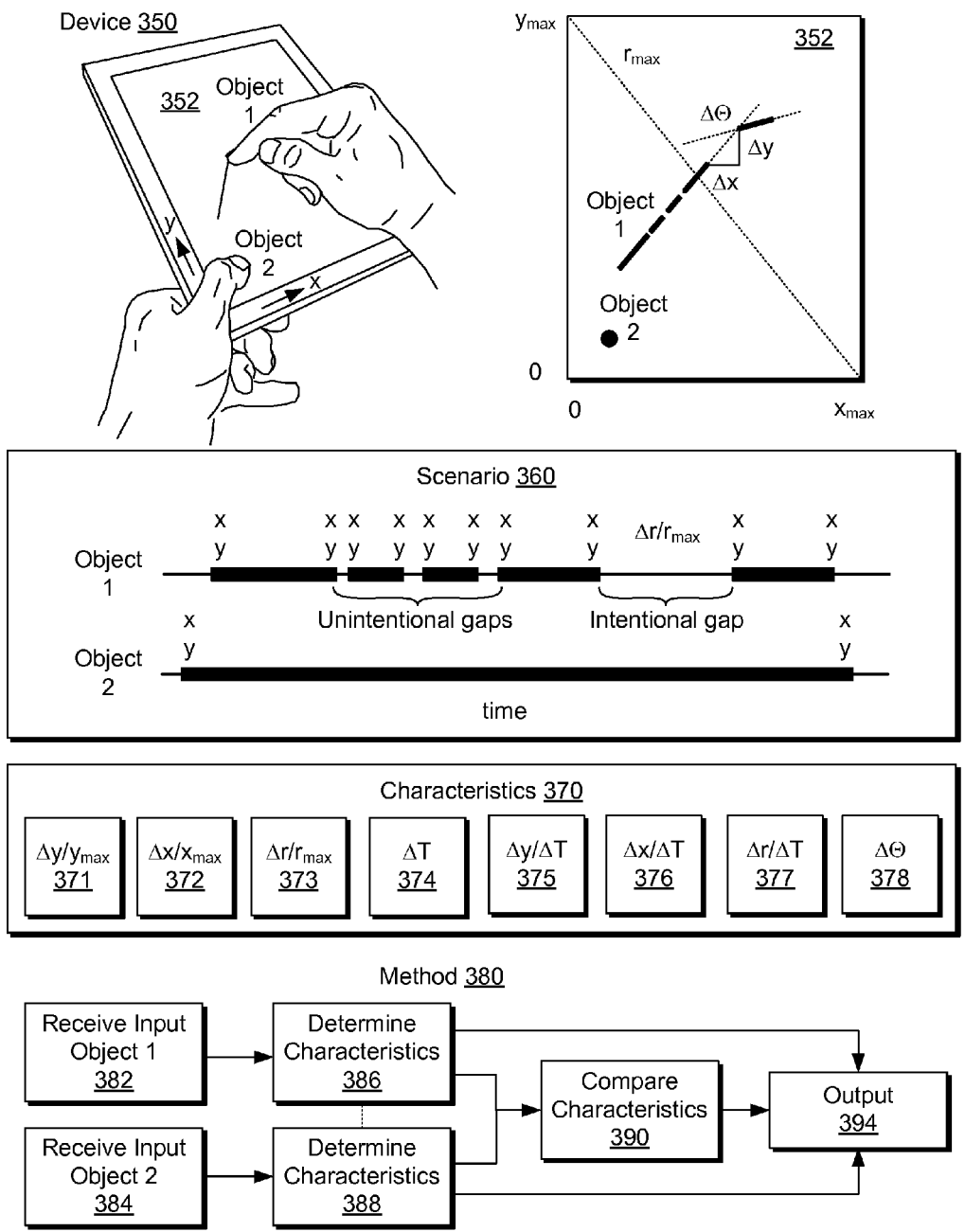
FIG. 3 is a series of diagrams of examples of a device, an input scenario, characteristics of input and a method.

FIG. 3 shows an example of a device 350 for an input scenario 360, which is described with respect to various characteristics 370 and a method 380. In the example of FIG. 3, two objects result in the sensor display 352 registering input. A plot for the scenario 360 shows information for these two objects with respect to time (e.g., information output by the sensor display 352). For object 1, unintentional gaps are indicated along with an intentional gap. Determinations as to whether a gap is intentional or unintentional may be made using one or more of the characteristics 370.

In the example of FIG. 3, the characteristics include $\Delta y/y_{max}$ 371, $\Delta x/x_{max}$ 372, $\Delta r/r_{max}$ 373, $\Delta T$ 374, $\Delta y/\Delta T$ 375, $\Delta x/\Delta T$ 376, $\Delta r/\Delta T$ 377, and $\Delta\Theta$ 378. Accordingly, fractions or percentages of distance with respect to a screen dimension or distance may be used to decide whether a gap is intentional or unintentional (e.g., continuous or discontinuous). For example, if a gap, as a percentage of a sensor display distance, is greater than a certain threshold percentage, then it may be deemed to be an intentional gap (see, e.g., the intentional gap of the scenario 360). As another example, consider an angle where a change in angle may generate a $\Delta\Theta$ characteristic that, if greater than a certain threshold angle, results in a gap being considered an intentional gap.

In the example of FIG. 3, the method 380 includes reception block 382 and 384 for receiving input associated with objects 1 and 2, determination blocks 386 and 388 for determining characteristics associated with the received input, a comparison block 390 for comparing one or more characteristics to one or more other characteristics or one or more thresholds and an output block 394 for outputting information, for example, information sufficient to determine how received input should be rendered to a display. In the example method 380, the determination block 386 and 388 may be a single block as indicated by a dotted line connecting the blocks.

Figure 4:
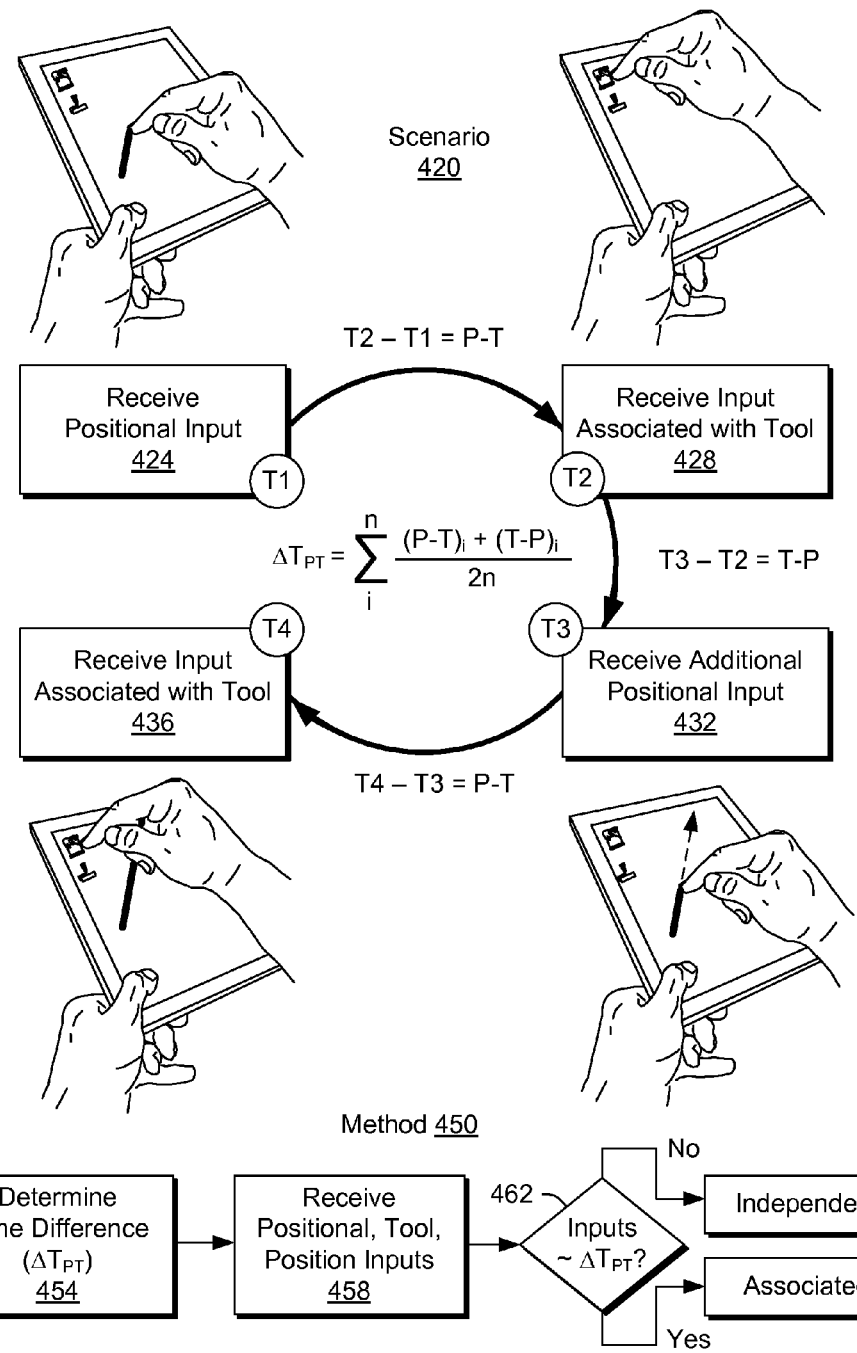
FIG. 4 is a series of diagrams of examples of a scenario and a method.

FIG. 4 shows an example of a scenario 420 and a method 450. In the scenario 420, a device receives positional input 424 at time T1, input associated with a tool 428 at time T2, positional input 432 at time T3 and input associated with a tool at time T4. For example, where the device is executing a drawing application with various types of drawing tools (e.g., a paint can, a paint roller, etc.), a user may select via finger or stylus manipulation a graphic associated with a drawing tool and then draw. In an example of a paint can, a user may "dip" her finger in the paint can (e.g., icon) and then draw until the paint runs out. The user can then refresh the tool by re-dipping her finger in the paint can. As indicated with respect to the scenario 420, a device may be configured to determine a time difference between positional input and tool input. Where such a time difference occurs on a regular basis, such information may be relied on as a characteristic of user input and optionally relied on in making a decision related to how to render information to a display.

The method 450 includes a determination block 454 for determining a time difference for user input (e.g., $\Delta T_{PT}$ as a tool-position-tool time difference, etc.), a reception block 458 for receiving inputs, and a decision block 462 for deciding whether the inputs are, for example, periodic based on a determined time difference (e.g., $\Delta T_{PT}$). In the example of FIG. 4, where the decision block 462 decides that input events do not fall within a range about a time difference, the method 450 continues to an independent event block 464 for indicating that the events are independent. Where the decision block 462 decides otherwise, the method 450 continues to an associated event block 468 for indicating that the events are associated (e.g., part of a drawing process). In the scenario 420, at time T4, the rendered output provides for a continuous line as the time gap conforms to a time difference associated with a drawing process (e.g., dip, draw, dip . . . or draw, dip, draw . . . , etc.).

Figure 5:
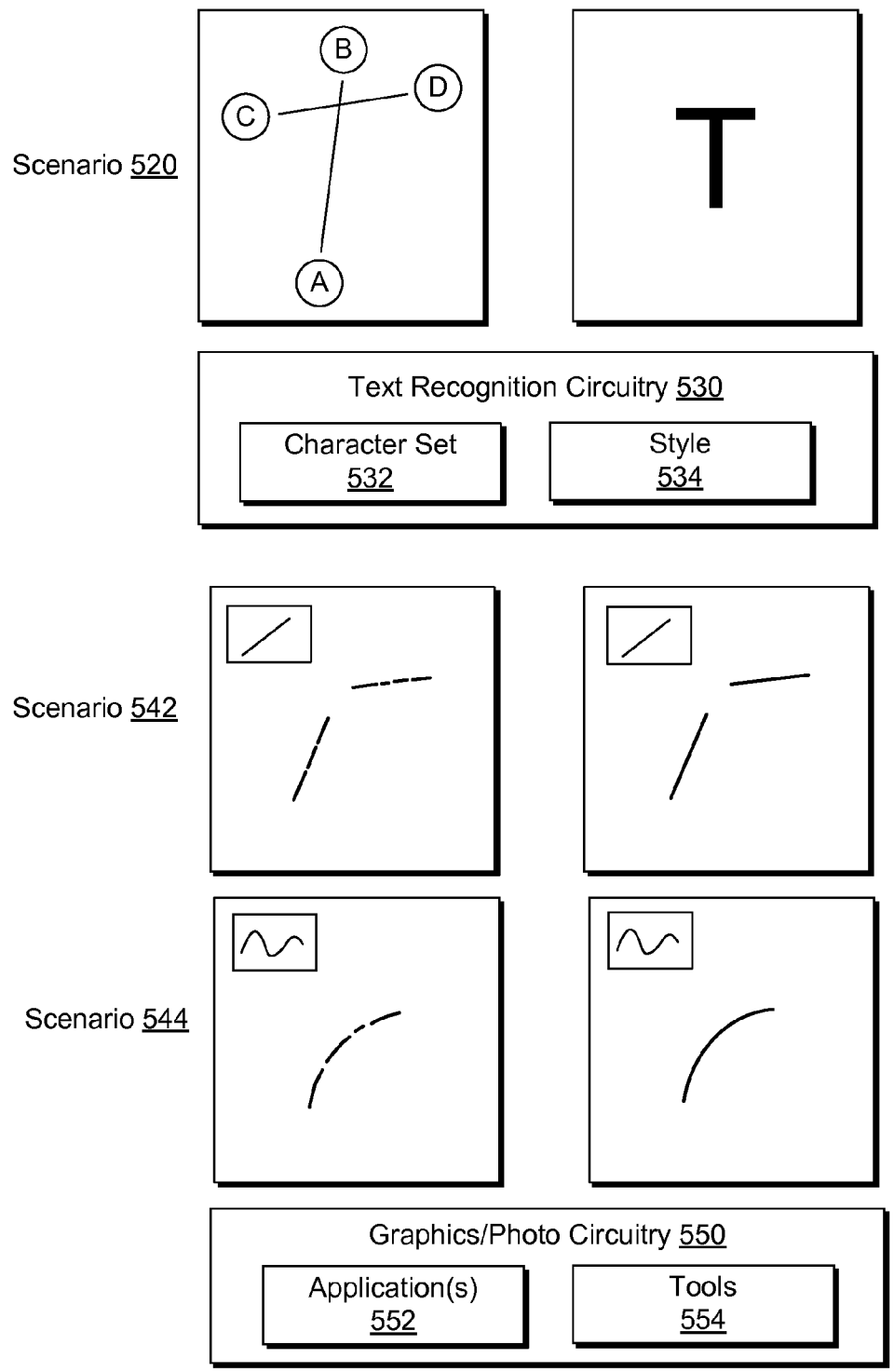
FIG. 5 is a series of diagrams of examples of scenarios, circuitry configured to perform text recognition and graphics or other tasks.

FIG. 5 shows examples of scenarios 520, 542 and 544 with respect to text recognition circuitry 530 and graphics circuitry 550. In the scenario 520, a user inputs two lines, one from point A to point B and another from point C to point D. In turn, circuitry 530 processes the input and calls for rendering the character "T" to a display. In the example scenario 530, bumps or lifts in user input along user input from A to B or user input from C to D may be considered as unintentional because when output of a sensor display is provided to the circuitry 530, the character "T" is recognized. However, even given the circuitry 530, a gap in output from a sensor display may cause recognition of an incorrect character. Accordingly, as described herein, a method or circuitry for handling gaps may be implemented prior to or as part of a character recognition algorithm or circuitry. In such a manner, text recognition may be improved.

In the example of FIG. 5, the text recognition circuitry 530 includes character set circuitry 532 and style circuitry 534. Such circuitry may allow a user to select a particular character set (e.g., Chinese, Korean, Arabic, etc.) and a style (e.g., block, cursive, etc.).

In the example of FIG. 5, the circuitry 550 includes application circuitry 552 for implementing one or more applications and tools circuitry 554 for implementing one or more tools. The scenarios 542 and 544 pertain to drawing tools associated with a graphics application. In the example of FIG. 5, the scenario 542 pertains to a line tool and the scenario 544 pertains to a curve tool. As described herein, graphics or photo or other similar types of circuitry 550 may be configured to operate in conjunction with compensation circuitry that can compensate for gaps in input (e.g., bumps, lifts, extraneous contact, etc.).

Figure 6:
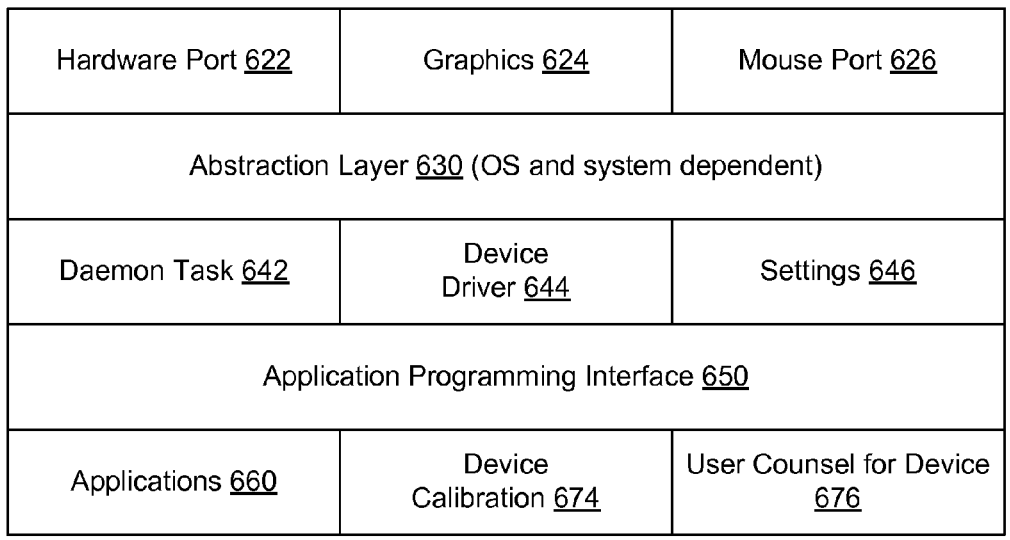
FIG. 6 is a series of diagrams of examples of a device driver architecture and a method.
Figure 6:
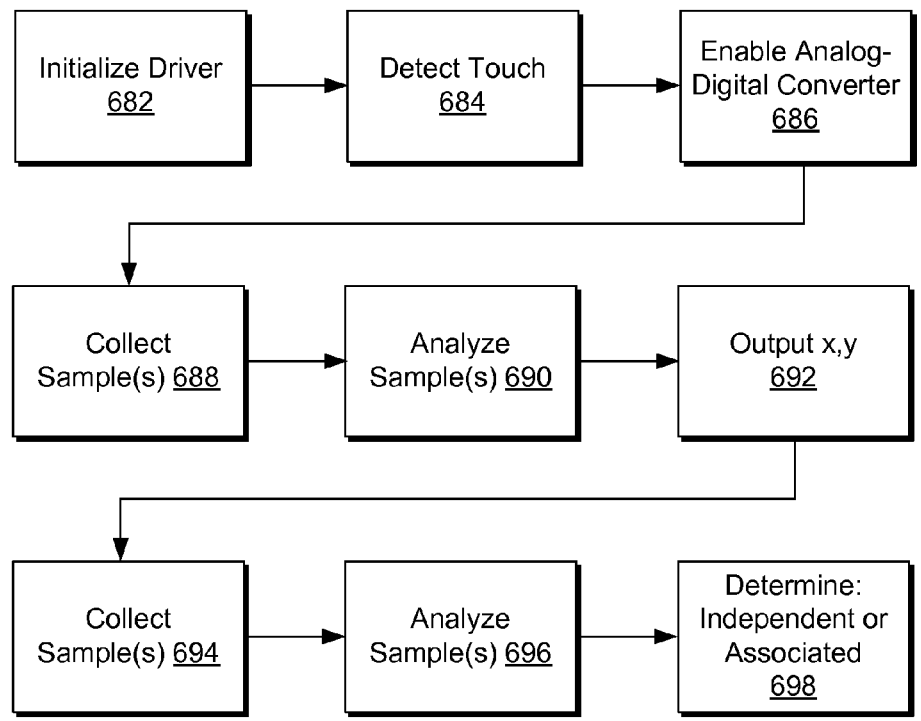

FIG. 6 shows an example of a device driver architecture 610 and an example of a method 680. The architecture 610 includes various layers, including an abstraction layer 630 and an application programming interface layer 650 (e.g., API). As described herein, various techniques may be implemented with respect to one or more layers of a device driver architecture. For example, compensation techniques may be implemented in an abstraction layer, an API layer, or other layer. In the example of FIG. 6, settings 646 may include settings to compensate for gaps. Alternatively, compensation techniques may rely on the API layer 650. As described herein, a user counsel for a sensor display component 676 may provide for a graphical user interface for adjusting one or more of the settings 646.

The method 680 includes an initialization block 682 for initializing a driver, a detection block 684 for detecting touch, an enable block 686 for enabling an analog-to-digital converter or other circuitry associated with a sensor display, a collection block 688 for collecting touch samples, an analysis block 690 for analyzing samples and an output block 692 for outputting information associated with touch samples. As described herein, the output of block 692 may represent a particular position (e.g., x, y) at a particular time. According to the method 680, a subsequent collection block 694 collects further samples and an analysis block 696 performs an analysis on the further collected samples, optionally in conjunction with output from the block 692 or samples of the block 688. A determination block 698 may then determine whether the samples of the sample block 694 are associated with or independent of the samples of the prior sample block 688.

Figure 7:
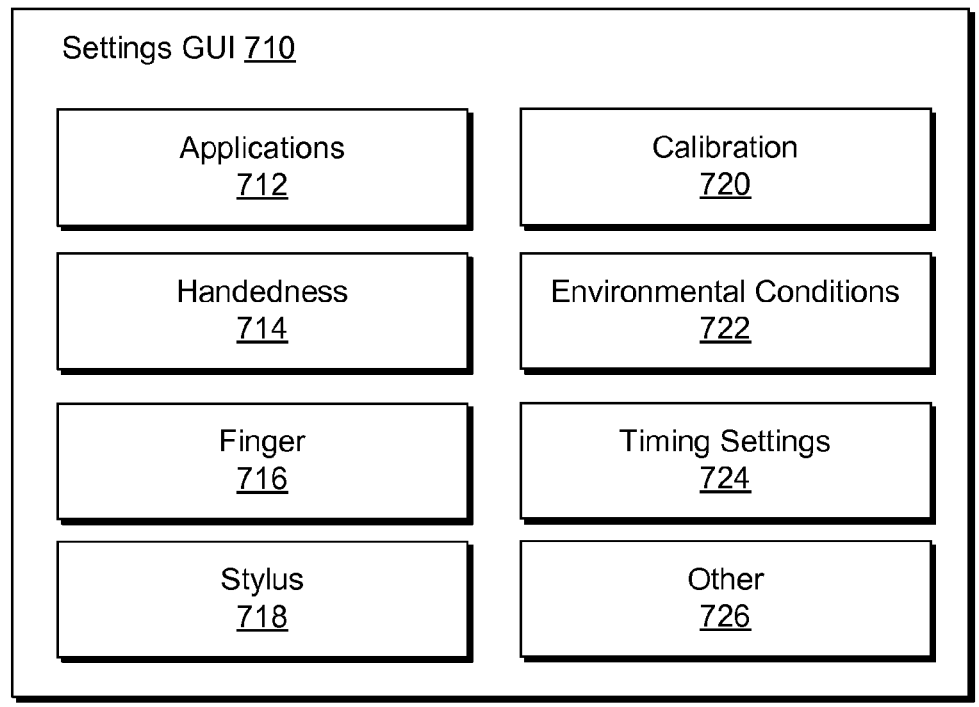
FIG. 7 is a series of diagrams of examples of graphical user interfaces.
Figure 7:
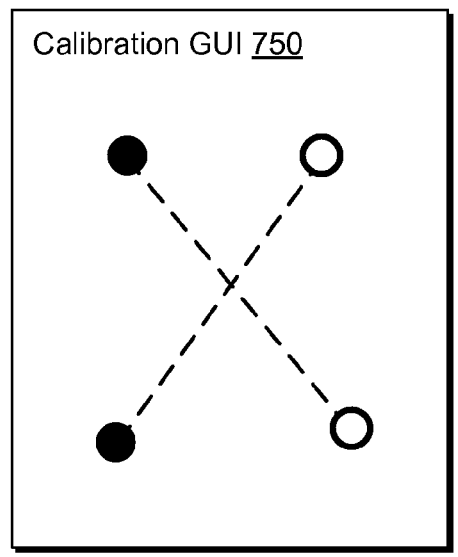
Figure 7:
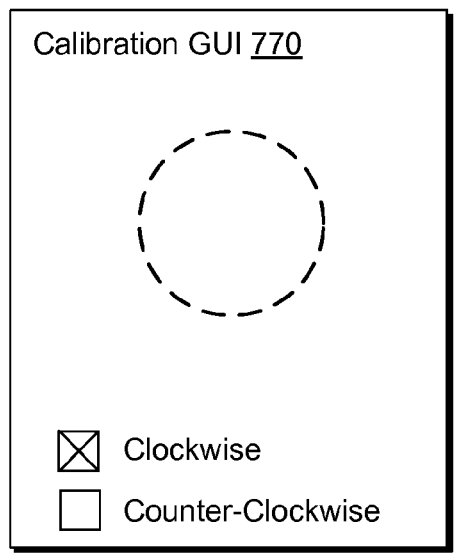

FIG. 7 shows an example of a settings graphical user interface (GUI) 710 and examples of two calibration GUIs 750 and 760. The GUI 710 may provide a user with graphical control options to set profiles for a compensation technique with respect to applications 712, handedness 714 (e.g., right handed or left handed), finger features 716, stylus type 718, calibration 720, environmental conditions 722 (e.g., wet, dry, oily, etc.), timing settings 724 or other settings 726.

With respect to calibration, the calibration GUI 750 may prompt a user to draw two straight lines (e.g., one bottom to top and one top to bottom). Output from a sensor display may be analyzed to determine whether gaps exists and characteristics of output, for example, as associated with one or more gaps (or non-gaps). In turn, circuitry may automatically determine settings for the user to compensate for gaps and to generate improved ink.

With respect to the calibration GUI 770, a user may be prompted to draw a circle in a clockwise direction and a counter-clockwise direction. In turn, output from a sensor display may be analyzed to determine whether gaps exist and characteristics of output. For example, a user's finger may be smooth on one side and rough on another side. The circle calibration technique may automatically set settings for directional movements that account for variations in roughness of a finger, a stylus, or even the display itself (e.g., due to wear). For example, for a right-handed person, the index finger may be smoother on the thumb side and result in fewer lifts; whereas, the middle finger side of the index finger may be rough and cause more lifts. A calibration test such as the circle test of the GUI 770 may collect information that can discern such differences and optionally automatically compensate via directional movement settings for finger input. While the example is described with respect to a finger, such a technique can also apply to a stylus or other object used for input.

As described herein, a method can include sensing two successive positional inputs input via a sensor display, determining a time difference between the two successive positional inputs and rendering, to the sensor display, a graphic between the two successive positional inputs if the time difference does not exceed a time difference threshold. Such a method may further include determining a distance between the two successive positional inputs, for example, where the rendering renders the graphic if the distance does not exceed a distance threshold or determining a distance percentage based at least in part on a dimension of the sensor display and rendering the graphic if the distance percentage does not exceed a distance percentage threshold.

As described herein, sensing may be resistive sensing, ultrasonic sensing, capacitive sensing, pressure sensing, optical sensing or other type of sensing.

As described herein, a method can include executing a type of application and selecting a time difference threshold (or other threshold) based at least in part on the type of application. Such an application may be a character recognition application, a drawing application or other type of application.

With respect to one or more time difference threshold values, such values may be determined automatically or according to a default. A default value may be about 500 ms, for example, where a time difference (e.g., for successive input) less than approximately 500 ms is considered as being associated with an unintentional gap.

As described herein, a method can include executing a character recognition application for recognizing characters of a language. A method may include rendering a line associated with a graphics application tool (e.g., paint, straight line, curve, etc.).

As described herein, a method can include sensing two successive positional inputs and associating the inputs with a first object and sensing positional input associated with another object. In such an example, a method may avoid rendering a graphic between a positional input for the first object and a positional input for the other object based at least in part on a distance between the positional input for the first object and the positional input for the other object.

As described herein, an apparatus can include a display, a sensor configured to sense positions of one or more objects in relation to the display, circuitry configured to determine a time difference between two successively sensed positions of an object and circuitry configured to render to the display a graphic connecting the two successively sensed positions if a time difference between the two successively sensed positions of an object does not exceed a time difference threshold. Such an apparatus may include a sensor with associated sensing circuitry configured for resistance sensing, ultrasonic sensing, capacitive sensing, pressure sensing, optical sensing or other type of sensing.

As described herein, an apparatus may include circuitry configured to execute a character recognition application, a drawing application or both types of applications. Further, circuitry may be included to select a time difference threshold (or one or more other thresholds) for a character recognition application and to select a time difference threshold for a drawing application. As described herein, circuitry may be configured to render to a display a graphic connecting two successively sensed positions renders the graphic if a time difference between the two successively sensed positions of an object does not exceed a time difference threshold and if a distance between the two successively sensed positions of the object does not exceed a distance threshold.

As described herein, one or more computer-readable storage media can include computer-executable instructions to instruct a computer to: execute an application; sense two successive positional inputs input via a touch display; determine a time difference between the two successive positional inputs; and render, to the touch display, a graphic connecting the two successive positional inputs if the time difference does not exceed a time difference threshold associated with the application. Such media may further include instructions to instruct a computer to execute a different application associated with a different time difference threshold. As described herein, one or more computer-readable storage media may include computer-executable instructions to instruct a computer to determine a distance between two successive positional inputs and to render, to a touch display, a graphic connecting the two successive positional inputs if the distance does not exceed a distance threshold.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions. Such circuitry may optionally rely on one or more computer-readable media that includes computer-executable instructions. As described herein, a computer-readable medium may be a storage device (e.g., a memory card, a storage disk, etc.) and referred to as a computer-readable storage medium.

Figure 8:
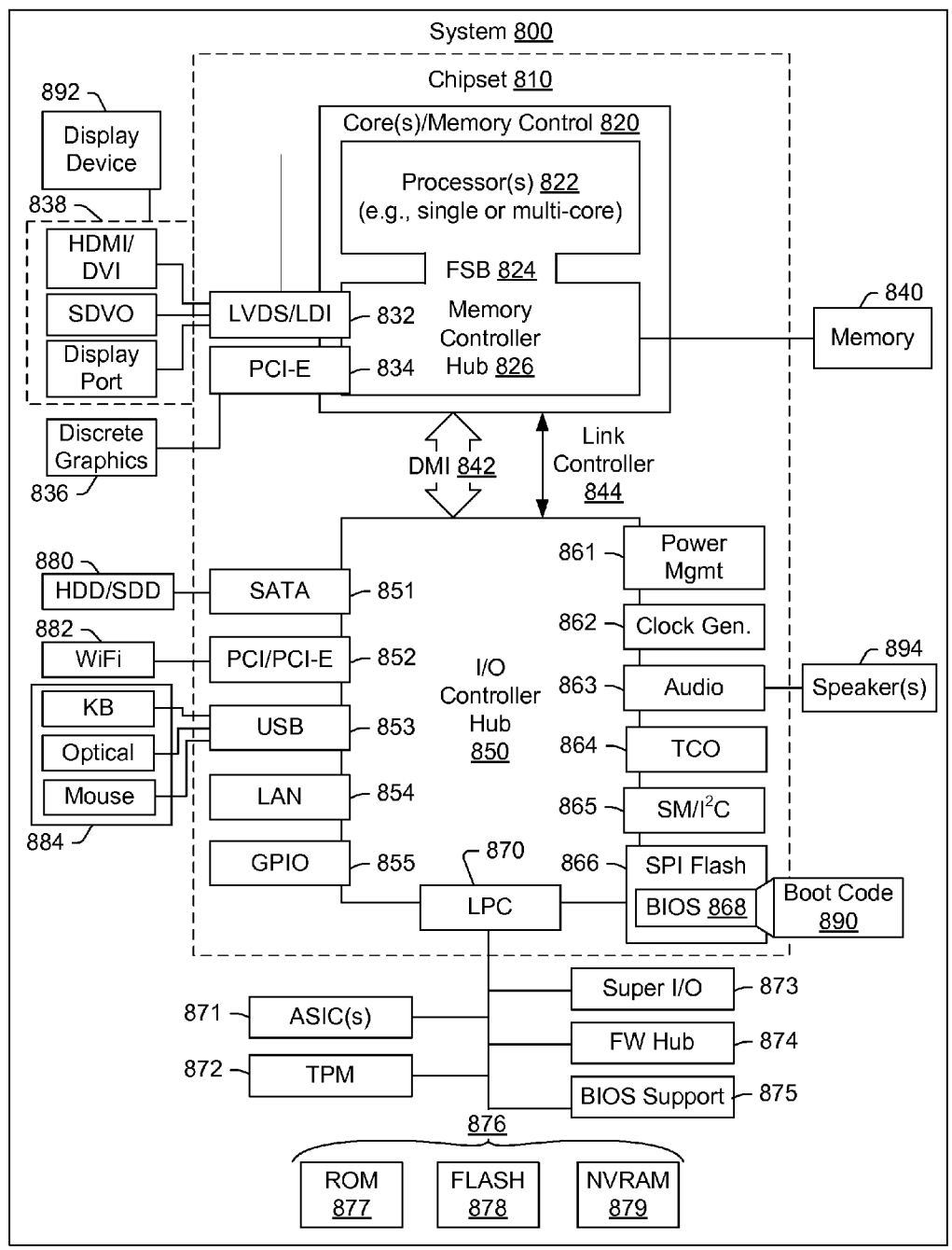
FIG. 8 is a diagram of an example of a machine.

While various examples of circuits or circuitry have been discussed, FIG. 8 depicts a block diagram of an illustrative computer system 800. The system 800 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a satellite, a base, a server or other machine may include other features or only some of the features of the system 800. As described herein, a device such as the device 120 of FIG. 1, the device 250 of FIG. 2, the device 350 of FIG. 3, etc., may include at least some of the features of the system 800.

As shown in FIG. 8, the system 800 includes a so-called chipset 810. A chipset refers to a group of integrated circuits, or chips, that are designed to work together. Chipsets are usually marketed as a single product (e.g., consider chipsets marketed under the brands INTEL®, AMD®, etc.).

In the example of FIG. 8, the chipset 810 has a particular architecture, which may vary to some extent depending on brand or manufacturer. The architecture of the chipset 810 includes a core and memory control group 820 and an I/O controller hub 850 that exchange information (e.g., data, signals, commands, etc.) via, for example, a direct management interface or direct media interface (DMI) 842 or a link controller 844. In the example of FIG. 8, the DMI 842 is a chip-to-chip interface (sometimes referred to as being a link between a "northbridge" and a "southbridge").

The core and memory control group 820 include one or more processors 822 (e.g., single core or multi-core) and a memory controller hub 826 that exchange information via a front side bus (FSB) 824. As described herein, various components of the core and memory control group 820 may be integrated onto a single processor die, for example, to make a chip that supplants the conventional "northbridge" style architecture.

The memory controller hub 826 interfaces with memory 840. For example, the memory controller hub 826 may provide support for DDR SDRAM memory (e.g., DDR, DDR2, DDR3, etc.). In general, the memory 840 is a type of random-access memory (RAM). It is often referred to as "system memory".

The memory controller hub 826 further includes a low-voltage differential signaling interface (LVDS) 832. The LVDS 832 may be a so-called LVDS Display Interface (LDI) for support of a display device 892 (e.g., a CRT, a flat panel, a projector, etc.). A block 838 includes some examples of technologies that may be supported via the LVDS interface 832 (e.g., serial digital video, HDMI/DVI, display port). The memory controller hub 826 also includes one or more PCI-express interfaces (PCI-E) 834, for example, for support of discrete graphics 836. Discrete graphics using a PCI-E interface has become an alternative approach to an accelerated graphics port (AGP). For example, the memory controller hub 826 may include a 16-lane (×16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 850 includes a variety of interfaces. The example of FIG. 8 includes a SATA interface 851, one or more PCI-E interfaces 852 (optionally one or more legacy PCI interfaces), one or more USB interfaces 853, a LAN interface 854 (more generally a network interface), a general purpose I/O interface (GPIO) 855, a low-pin count (LPC) interface 870, a power management interface 861, a clock generator interface 862, an audio interface 863 (e.g., for speakers 894), a total cost of operation (TCO) interface 864, a system management bus interface (e.g., a multi-master serial computer bus interface) 865, and a serial peripheral flash memory/controller interface (SPI Flash) 866, which, in the example of FIG. 8, includes BIOS 868 and boot code 890. With respect to network connections, the I/O hub controller 850 may include integrated gigabit Ethernet controller lines multiplexed with a PCI-E interface port. Other network features may operate independent of a PCI-E interface.

The interfaces of the I/O hub controller 850 provide for communication with various devices, networks, etc. For example, the SATA interface 851 provides for reading, writing or reading and writing information on one or more drives 880 such as HDDs, SDDs or a combination thereof. The I/O hub controller 850 may also include an advanced host controller interface (AHCI) to support one or more drives 880. The PCI-E interface 852 allows for wireless connections 882 to devices, networks, etc. The USB interface 853 provides for input devices 884 such as keyboards (KB), one or more optical sensors (see, e.g., the sensor 256 of FIG. 2), mice and various other devices (e.g., cameras, phones, storage, media players, etc.). On or more other types of sensors may optionally rely on the USB interface 853 or another interface (e.g., I²C, etc.).

In the example of FIG. 8, the LPC interface 870 provides for use of one or more ASICs 871, a trusted platform module (TPM) 872, a super I/O 873, a firmware hub 874, BIOS support 875 as well as various types of memory 876 such as ROM 877, Flash 878, and non-volatile RAM (NVRAM) 879. With respect to the TPM 872, this module may be in the form of a chip that can be used to authenticate software and hardware devices. For example, a TPM may be capable of performing platform authentication and may be used to verify that a system seeking access is the expected system.

The system 800, upon power on, may be configured to execute boot code 890 for the BIOS 868, as stored within the SPI Flash 866, and thereafter processes data under the control of one or more operating systems and application software (e.g., stored in system memory 840). An operating system may be stored in any of a variety of locations and accessed, for example, according to instructions of the BIOS 868. Again, as described herein, a satellite, a base, a server or other machine may include fewer or more features than shown in the system 800 of FIG. 8.

CONCLUSION

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. A method comprising: sensing two successive positional inputs input via a sensor display; determining a time difference between two successive positional inputs; and rendering, to the sensor display, a graphic between the two successive positional inputs if the time difference does not exceed a time difference threshold wherein the time difference threshold comprises a time difference less than 500 ms.

2. The method of claim 1 further comprising determining a distance between the two successive positional inputs.

3. The method of claim 2 wherein the rendering renders the graphic if the distance does not exceed a distance threshold.

4. The method of claim 2 wherein the determining comprises determining a distance percentage based at least in part on a dimension of the sensor display and wherein the rendering renders the graphic if the distance percentage does not exceed a distance percentage threshold.

5. The method of claim 1 wherein the sensing comprises a member selected from a group consisting of resistance sensing, ultrasonic sensing, capacitive sensing, pressure sensing and optical sensing.

6. The method of claim 1 further comprising executing a type of application and selecting the time difference threshold based at least in part on the type of application.

7. The method of claim 6 wherein the type of application comprises a type selected from a group consisting of character recognition applications and drawing applications.

8. The method of claim 1 further comprising executing a character recognition application for recognizing characters of a language.

9. The method of claim 1 wherein the rendering renders a line associated with a graphics application tool.

10. The method of claim 1 wherein the sensing two successive positional inputs comprises associating the inputs with a first object and further comprising sensing positional input associated with another object.

11. The method of claim 10 where the rendering avoids rendering a graphic between a positional input for the first object and a positional input for the other object based at least in part on a distance between the positional input for the first object and the positional input for the other object.

12. An apparatus comprising:
a display;
a sensor that senses positions of one or more objects in relation to the display;
circuitry that determines a time difference between two successively sensed positions of an object;
circuitry that renders to the display a graphic connecting the two successively sensed positions if a time difference between the two successively sensed positions of an object does not exceed a time difference threshold;
circuitry that executes a character recognition application and a drawing application; and
circuitry that selects a time difference threshold for a character recognition application and that selects a time difference threshold for a drawing application.

13. The apparatus of claim 12 wherein the sensor comprises sensing circuitry configured for a member selected from a group consisting of resistance sensing, ultrasonic sensing, capacitive sensing, pressure sensing and optical sensing.

14. The apparatus of claim 12 wherein the circuitry that renders to the display a graphic connecting the two successively sensed positions renders the graphic if a time difference between the two successively sensed positions of an object does not exceed a time difference threshold and if a distance between the two successively sensed positions of the object does not exceed a distance threshold.

15. One or more non-transitory computer-readable storage media comprising computer-executable instructions to instruct a computer to:
execute an application;
sense two successive positional inputs input via a touch display;
determine a time difference between the two successive positional inputs;
render, to the touch display, a graphic connecting the two successive positional inputs if the time difference does not exceed a time difference threshold associated with the application; and
execute a different application associated with a different time difference threshold.

16. The one or more non-transitory computer-readable storage media of claim 15 further comprising computer-executable instructions to instruct a computer to determine a distance between the two successive positional inputs and to render, to the touch display, a graphic connecting the two successive positional inputs if the distance does not exceed a distance threshold.

17. A method comprising:
sensing two successive positional inputs input via a sensor display;
determining a time difference between the two successive positional inputs;
determining a distance between the two successive positional inputs wherein the determining comprises determining a distance percentage based at least in part on a dimension of the sensor display; and
rendering, to the sensor display, a graphic between the two successive positional inputs if the time difference does not exceed a time difference threshold and if the distance percentage does not exceed a distance percentage threshold.

18. A method comprising:
executing a type of application and selecting a time difference threshold based at least in part on the type of application;
sensing two successive positional inputs input via a sensor display;
determining a time difference between the two successive positional inputs; and
rendering, to the sensor display, a graphic between the two successive positional inputs if the time difference does not exceed the time difference threshold.

19. The method of claim 18 wherein the type of application comprises a type selected from a group consisting of character recognition applications and drawing applications.

20. A method comprising:
sensing two successive positional inputs input via a sensor display wherein the sensing two successive positional inputs comprises associating the inputs with a first object and further comprising sensing positional input associated with another object;
determining a time difference between the two successive positional inputs; and
rendering, to the sensor display, a graphic between the two successive positional inputs if the time difference does not exceed a time difference threshold wherein the rendering avoids rendering a graphic between a positional input for the first object and a positional input for the other object based at least in part on a distance between the positional input for the first object and the positional input for the other object.

21. An apparatus comprising:
circuitry that executes a character recognition application and a drawing application;
a display;
a sensor that senses positions of one or more objects in relation to the display;
circuitry that determines a time difference between two successively sensed positions of an object; and
circuitry that renders to the display a graphic connecting the two successively sensed positions if a time difference between the two successively sensed positions of an object does not exceed a time difference threshold and if a distance between the two successively sensed positions of the object does not exceed a distance threshold.

\* \* \* \* \*